United States Patent
Hunt

[11] Patent Number: 5,983,280
[45] Date of Patent: *Nov. 9, 1999

[54] SYSTEM USING STANDARD ETHERNET FRAME FORMAT FOR COMMUNICATING MIDI INFORMATION OVER AN ETHERNET NETWORK

[75] Inventor: Mark A. Hunt, Birmingham, United Kingdom

[73] Assignee: Light & Sound Design, Ltd., Birmingham, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,257
[22] Filed: Mar. 29, 1996
[51] Int. Cl.$^6$ ....................................................... G06F 13/00
[52] U.S. Cl. ............................................ 709/236; 709/230
[58] Field of Search .............................. 348/15; 709/236, 709/230

[56] References Cited

U.S. PATENT DOCUMENTS

5,574,949  11/1996  Tsurumi ................................... 395/850
5,675,139  10/1997  Fama ......................................... 235/472
5,687,387  11/1997  Endejan et al. .......................... 395/822
5,689,641  11/1997  Ludwig et al. ............................ 348/15
5,713,006   1/1998  Shigeeda ................................... 395/653

OTHER PUBLICATIONS

Comer, "Internetworking with TCP/IP second edition vol. 1", 1991, pp. 25–27.

*Primary Examiner*—Le Hien Luu
*Attorney, Agent, or Firm*—Fish & Richardson P.C.

[57] ABSTRACT

A technique of allowing MIDI format information to be transmitted over an Ethernet connection. The MIDI is changed to Ethernet, and an Ethernet broadcast or multicast address is used. This allows the Ethernet to be delivered to multiple locations, much like the original MIDI information. Using the multicast address allows non-MIDI devices to be present on the same bus without interference from the MIDI commands.

9 Claims, 2 Drawing Sheets

SYSTEM USING STANDARD ETHERNET FRAME FORMAT FOR COMMUNICATING MIDI INFORMATION OVER AN ETHERNET NETWORK

FIELD OF THE INVENTION

The present invention relates to a MIDI communications system which expands MIDI functionality using standard and available hardware. More specifically, the present invention teaches a way of using a network protocol to simulate the MIDI protocol to allow MIDI to be used with existing hardware and systems for that network protocol.

BACKGROUND AND SUMMARY OF THE INVENTION

Many entertainment control systems have recently been made with MIDI capabilities. The MIDI format allows many different kinds and types of information to be communicated—including information about the music being played and/or something associated with that music. MIDI's popularity is due, at least in part, to its great communications capability. MIDI allows entertainment control systems to communicate status and receive information from other MIDI-equipped devices.

Musical instruments often are connected by a MIDI connection to a controller. The controller can monitor the settings of the musical instruments, including the notes they play, its tone, and other things. FIG. 1 shows, for example, synthesizer 100 connected by a MIDI connection 102 to MIDI controller 104. Controller 104 monitors the notes and information which is output from synthesizer 100.

MIDI can also be used as a control technique. For example, controller 104 can control synthesizer 108 instrument 110 via MIDI cable 106.

Despite MIDI's great power, it is a relatively simple protocol. All messages that are sent over cable 106 are received by both of the controlled units 108, 110. That is to say, MIDI's communications is dependent on the wired connection between devices. This means that MIDI in general is contrary to the usual complexity of conventional networking techniques. In a usual network technique, logical connections need to be made between devices after the cabling has been attached. MIDI uses the cabling itself to make these logical connections.

MIDI musical data is arranged as a stream of events occurring at specified intervals. The following is a typical stream of MIDI data:

Header format=0 ntrks=1 division=240
Track start
Delta time=0 Time signature=¾ MIDI-clocks/click=24 32nd notes/24-MIDI -clocks=8
Delta time=0 Tempo, microseconds-per-MIDI-quarter-note=41248
Delta time=0 Meta Text, type=0×01 (Text Event) leng=23
    Text =<Chorale #001 in G Major>
Delta time=480 Note on, chan=1 pitch=67 vol=88
Delta time=0 Note on, chan=2 pitch=62 vol=72
Delta time=0 Note on, chan=3 pitch=59 vol=88
Delta time=240 Note off, chan=4 pitch=43 vol=64
Delta time=0 Note off, chan=3 pitch=59 vol=64
Delta time=0 Note off, chan=2 pitch=62 vol=64
Delta time=0 Note off, chan=1 pitch 67 vol=64
Delta time=0 Note on, chan=1 pitch=67 vol=81
Delta time=0 Note on, chan=2 pitch=62 vol=75
Delta time=0 Note on, chan=3 pitch=59 vol=88
Delta time=0 Note on, chan=4 pitch=55 vol=60
Delta time=240 Note off, chan=4 pitch=55 vol=64
Delta time=0 Note off, chan=3 pitch=59 vol=64
Delta time=0 Note off, chan=2 pitch=62 vol=64
Delta time=0 Note on, chan=2 pitch=64 vol=58
Delta time=0 Note on, chan=3 pitch=60 vol=78
Delta time=1920 Meta Text, type=0×01 (Text Event) leng=7
    Text=<Fermata>

Each line in the stream is an event. For example, in the line "Delta time=240 Note off, chan=4 pitch=43 vol=64," the phrase "Delta time=240" means that the line starts executing 240 MIDI-clocks of time after the last line started executing. "Note off" indicates that the note presently being played by channel, i.e., voice "4" is to be turned off.

There are also many MIDI flavors. One such flavor is the so-called MIDI show control. MIDI show control uses its own addressing capability.

While MIDI is simple and effectual for the above reasons, the inventor noticed that MIDI has some disadvantages. MIDI data can only travel in one direction through a MIDI cable. Hence, a first, one-directional MIDI cable 102 receives information from the synthesizer and a different one-directional MIDI cable 106 sends the information to the synthesizer. Bi-directional communication hence, requires separate cables. Moreover, the MIDI protocols are generally limited to 15 feet in length and the relatively slow data rate of 31.25K Baud. While MIDI hardware is relatively inexpensive, this has limited its usefulness.

"MIDI thru" connectors can be used to extend data transmission distances. This uses a daisy chaining technique whereby a cable is input to a device, sent through appropriate electronics, and output from the device.

In view of the above limitations, it is an object of the present invention to improve MIDI's functionality while maintaining its usefulness. In order to carry out this objective, the present invention modifies MIDI in a way to maintain its advantages, but to attenuate its disadvantages. The preferred mode of the present invention converts the MIDI signals into a protocol which is compatible with existing network techniques, preferably Ethernet. Ethernet is well-known as a peer-to-peer connection scheme. The present invention uses a technique of configuring the Ethernet protocol in a way which is more MIDI-like. This enables MIDI techniques and communications to be used over an Ethernet link.

It should be understood that while the preferred mode of the present invention uses Ethernet hardware, other existing network hardware could alternately be used. Ethernet is preferred because of its simplicity and wide dissemination. However, the inventor contemplates that other network formats could also be used using the teaching of the present invention. An important feature of the present invention is its use of standard off-the shelf hardware for most of the functions that are carried out.

BRIEF DESCRIPTION OF THE DRAWING

These and other aspects of the present invention will now be described in detail with reference to the accompanying drawings, in which.

DESCRIPTION OF THE PREFERRED EMBODIMENTS

Figure 2:
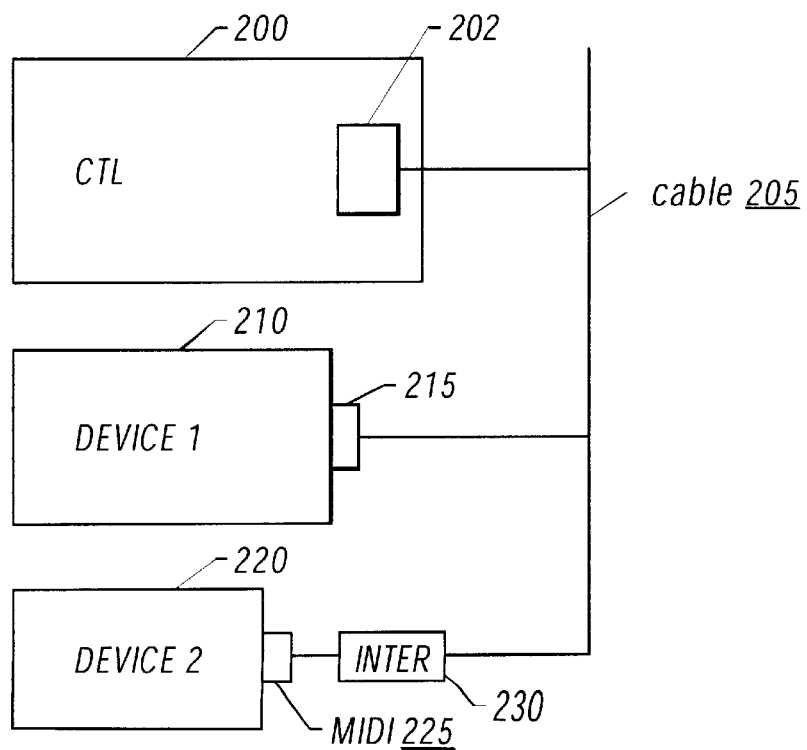
FIG. 2 shows a block diagram of a first preferred embodiment of the present invention which uses MIDI devices interconnected by an Ethernet network.

FIG. 2 shows the preferred embodiment of the invention which allows MIDI to "talk" to Ethernet ( referred to herein as "MIDI talk"). Controller 200 can be a personal computer or a specialized device for controlling MIDI. Controller 200 includes an Ethernet interface unit which converts the MIDI information into a form which can be communicated over the Ethernet protocol. In a personal computer, this could be embodied by an Ethernet card or a PCMCIA card. The Ethernet card 202 connects to a standard Ethernet cable 205 which carries the Ethernet communications between the controller and the other MIDI devices. Two MIDI devices 210, 220 are shown. Device 1 (210) is shown as a modified device which is specially modified to take advantage of the MIDItalk protocol. This modified device includes an Ethernet port 215 which connects directly to Ethernet cable 205. Device 2 (220) is a standard MIDI device. Device 2 connects via MIDI connection 225 which converts the MIDI format information to Ethernet protocol. An add-on interface unit 230 connects and converts between the MIDI output at 225 and a MIDI-talk Ethernet port. In a particularly preferred embodiment, this connection can be an Ethernet PCMCIA card.

Figure 1:
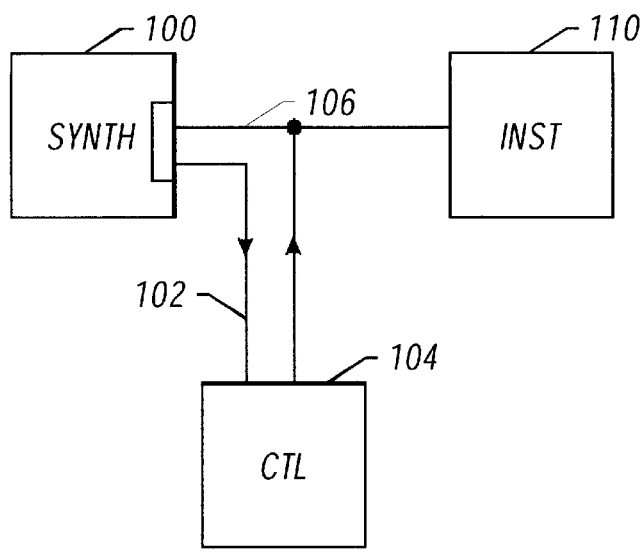
FIG. 1 shows a prior art MIDI connection.

The operation is not limited to use with only two devices as shown; other devices can of course be added. The connection to the Ethernet cable in this way establishes every possible connection between controller, device 1 and device 2. Unlike the setup of FIG. 1 where instrument 110 could only receive connections from controller 100, a simple Ethernet connection allows all possible commands between the connected units.

Ethernet is, however, a peer-to-peer communication system. This differs from the usual MIDI system which is a wired communication system between devices. The inventor of the present invention recognized that Ethernet includes certain protocols, not usually used, which can be modified to allow Ethernet to simulate the characteristics of MIDI. Specifically, the present invention preferably uses either the Ethernet broadcast address or Multicast address to allow MIDI-like communications.

The MIDITalk packet format preferably obeys certain rules defining the structure of Ethernet packets.

| Byte Offset | N  | Format         | Function                           |
|-------------|----|----------------|------------------------------------|
| 0–5         | 6  | $FFFFFFFFFFFF  | Ethernet "broadcast" address       |
| 6–11        | 6  | $address       | Ethernet address of sender         |
| 12–13       | 2  | $880E          | MIDITALK protocol identifier       |
| 14          | 1  | $42            | MIDITALK version number            |
| 15–16       | 2  | $bytecount     | 16 bit byte count for rest of packet |
| 17          | 1  | %xxxxxxxx      | Channel bit mask                   |
| 18          | 1  | $mtType        | 8 bit MIDITALK packet sub-type     |
| 19–end      | nn |                | Packet data                        |

The first 14 bytes of the packet are the standard Ethernet packet header. The Ethernet broadcast address configures MIDITALK to communicate via a broadcast protocol allowing a MIDITALK packet to be delivered to all physically connected ports, very much like the MIDI data that it will intended to transport.

An alternate embodiment uses the Ethernet "Multicast" address instead as described herein. This enables MIDITALK packets not to be received by non-MIDITALK clients on the same Ethernet network, saving the time in those units required to reject the MIDITALK packets (identifiable by the $880E type field.)

The Ethernet type field $880E has been assigned to Light & Sound Design by the Xerox Corporation.

The $42 byte defines this version of the MIDITALK. Future extensions to the protocol may use different values for this byte.

The bytecount field allows receiving software to determine how many bytes of data remain to be read.

The channel bit mask byte represents a logical connection channel that is similar to the SCSI select channel. This has 1 bit allocated to each of the 8 possible channels. Each bit enables the channel if set to logic 1 or disables the channel if set to logic 0. By convention, the least significant bit is channel 1 and the most significant bit is channel 8. This enables multiple channels to be used as a rough addressing scheme. The controller sets the channels by setting this value. Default setting is $FF which corresponds to all 1's.

Each receiver on each device maintains a similar value again defaulting to $FF. The device receiver uses this to determine whether a received packet should be delivered to the client's software in the controlled device. The decision is a simple logical AND between the stored value and the channel bit mask in the received packet. If the logical result is non-zero, than the packet is delivered.

The next byte is the MIDITALK subpacket. For example, Stored Value Received AND Result Action
%11010001 %00100000 %00000000 Don't deliver packet
%11010001 %00101111 %00000001 Deliver packet The channel bytes effectively allow a software reconnection among the Ethernet cable. The effect is to allow any device to receive data off any of the channels, without using a complicated physical cabling. If the packet has been accepted and is to be received, then the MIDITALK packet sub-type is inspected. This is done to determine if the data in the packet is of interest.

A number of SubTypes enable specific advantages in this operation. The following SubTypes have been defined at this time.

| $02 | MSC data, with some of the verbose bits removed |
| $03 | MTC, in 5-byte format |
| $04 | MIDI data (any legal MIDI message) |
| $05 | DMX dimmer data |

MIDI Show Control packet format.

When using this packet format, the bytes following the SubType byte contain a legal Midi Show Control ("MSC") message. The MIDI SysEx preamble has been shortened in this special case, since their presence is implied by the SubType of "MSC".

Only the <device_id> and <command_format> have been retained.

The trailing $F7 has been stripped too:

| $02 | 1 | SubType (already described) |
| $xx | 1 | device_id ($7F=All_Call) |

| $xx | 1 | command_format ($7F=All-Types) |
| --- | --- | --- |
| data | | up to 120 bytes MSC packet, starting with the MSC command byte (GO, GO_OFF, RESET, SET, etc.) |

Time Code

A universal time format is used to describe 24 hour time as milliseconds which have elapsed since 00:00:00 (hh:mm:ss). This is conveyed as a 32-bit value, with an additional 32-bit fixed-point fraction describing the difference in rate between "real"time and the rate at which time is currently changing in the system. If time was running at twice normal speed, the fixed point number would be 2.0. The 16 MSB's are the integer part, and the 16 LSB's are the fraction. This allows time-conscious systems to synchronize with reasonable accuracy. TIME messages are preferably sent every ½ second or so.

The packet format is as follows:

| $03 | 1 | subtype |
| --- | --- | --- |
| $tttttttt | | 32-bit time, in milliseconds since 00:00:00 |
| $rrrrrrrr | | 32-bit fixed point rate-of-change of time |

MIDI Data

The bytes following the SubType byte must contain a legal MIDI message. The first byte must be a MIDI Status Byte (with the MSB set), and no other bytes in the packet may have their MSB's set, unless the packet is a System Exclusive Message (SysEx), which is allowed to retain its closing "$F7." Note that the packet length is restricted by the maximum length of a MIDI message. Note messages with running status are permitted.

| $04 | 1 | SubType |
| --- | --- | --- |
| data, MIDI message, up to 128 bytes | | |

DMX Dimmer Data

This allows the transporting of DMX data through the MIDITALK protocol.

| $05 | 1 | SubType |
| --- | --- | --- |
| $XX | 1 | stream number (0–255) |
| $YY | 1 | DMX Start Code |
| data | | 0–512 up to 512 bytes of dimmer level data |

Note that the stream number allows up to 256×512 (=131072) dimmer channels to be individually addressed.

MSC 3D Position Packet Format

The following packet format has been defined to allow the communication of performer position (or any other spatial position information) in a standard format for use by control equipment which needs to respond to such spatial information.

The MSC command byte is $0F

This is followed by position records, of 7 bytes each, up to maximum of 128 bytes in the MSC packet.

Each position record is in the form.

| $NN | 1 | Performer ID, from 0 to 127 |
| --- | --- | --- |
| $XXXX | 2 | X position, in 2 7-bit chunks, forming a 14 bit X position |
| $YYYY | 2 | Y position, in 2 7-bit chunks, forming a 14 bit X position |
| $ZZZZ | 2 | Z position, in 2 7-bit chunks, forming a 14 bit position. |

The meanings of the X, Y, Z positions are individual to the generating device. It is expected that any client controller will be capable of performing the necessary transformations to bring the received positions into line with it's own private coordinate system.

The following rules are preferably followed between client and server.

The X,Y, Z axes must be orthogonal.
The scales of the X, Y, Z axes must be the same.
The point 0,0,0 is the center of the coordinate system.
The position data is received in 2×7 bit chunks per axis. This is because MIDI data bytes must have the MSB cleared. The first byte is by MIDI convention, the least significant byte.

The 14 bits received should preferably be regarded as the MOST significant bits of a 16 bit signed number.

| 14 bit | equ 16 bit | value |
| --- | --- | --- |
| $1FFF | $7FFC | +32764 |
| $0001 | $0004 | +4 |
| $0000 | $0000 | zero |
| $3FFF | $FFFC | −4 |
| $2001 | $8004 | −32764 |

A typical MSC 3D packet would read. . .

| F0, 7F,7F,02 | ;MSC SysEx header, All_Call |
| --- | --- |
| 7F,0F | ;All_Types, 3D data |
| 01,07,00,45,33,23,01 | ;performer #1 position |
| 02,00,00,34,12,00,01 | ;performer #2 position |
| 07,00,00,00,00,00,00 | ;performer #7 position |
| F7 | ;SysEx closes. |

It is expected that all the performer position data from a single tracking system would be available simultaneously. The packet format therefore allows up to 17 positions to share a transmission. Positions which have not changed need not be transmitted, but it is suggested that tracking systems periodically update their clients with each performer's position, perhaps once a second.

This feature should be enabled/controlled at the tracking system's controls, although MSC messages could be sent to control it remotely.

This protocol has important uses. One important use for this protocol is for the automatic tracking of performers by moving lights. Another is for automatic control of stage monitoring loudspeakers, which need to be reduced in volume as the performer approaches them. Yet another use is to provide a fail-safe mechanism for the triggering of fireworks and machinery, so that equipment can refuse to operate if a performer is in a hazardous area.

This is not meant to imply that normal safe working practices should be replaced by the use of this protocol, but that its use could provide additional safety, and reduce the potential for human error even further.

As can be seen, therefore, this invention modifies the Ethernet protocol in a way which enables its operation in a way which simulates MIDI.

The above has discussed using the broadcast address in Ethernet. Ethernet also supports a Multicast address, which allows only those units which respond to the Multicast address to be understood.

Figure 3:
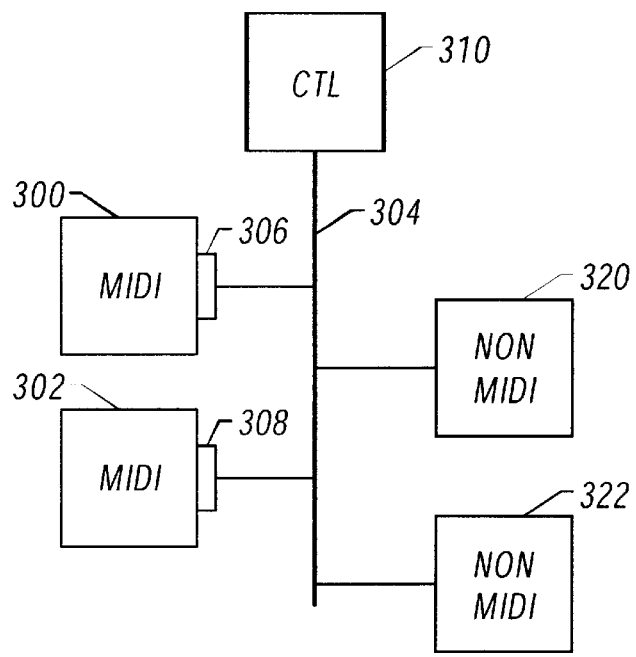
FIG. 3 shows a block diagram of a second preferred embodiment of the present invention which uses MIDI devices interconnected by an Ethernet network along with non-MIDI devices on the same network.

This facilitates a system such as shown in FIG. 3. FIG. 3 shows MIDI devices 300, 302 attached to the Ethernet bus 304. The interface device 306 converts from the MIDI output to the Ethernet port as described above. Interface device 306 is set to respond to the Multicast address. When information is to be sent to the MIDI devices, controller 310 also sends to the Multicast address which is received by devices 300 and 302.

Non-MIDI devices 320, 322 are also placed on the Ethernet bus. These devices communicate in a way which is usually unrelated to the MIDI. For example, this could be two personal computers which are communicating over the Ethernet bus in way which is related to the show in progress, but not necessarily related to MIDI. In this situation, an Ethernet broadcast command would also be sent to the non-MIDI devices. This might interrupt the non-MIDI devices or cause broadcast-style messages to appear on their screens.

This raises the interesting possibility of using the network for word processing of a manual, keeping a log of events, communications between stage lighting personnel, or any other network operation that may be related to the musical program that is underway. At the same time, the MIDITalk communications occurs over that same bus.

Figure 4:
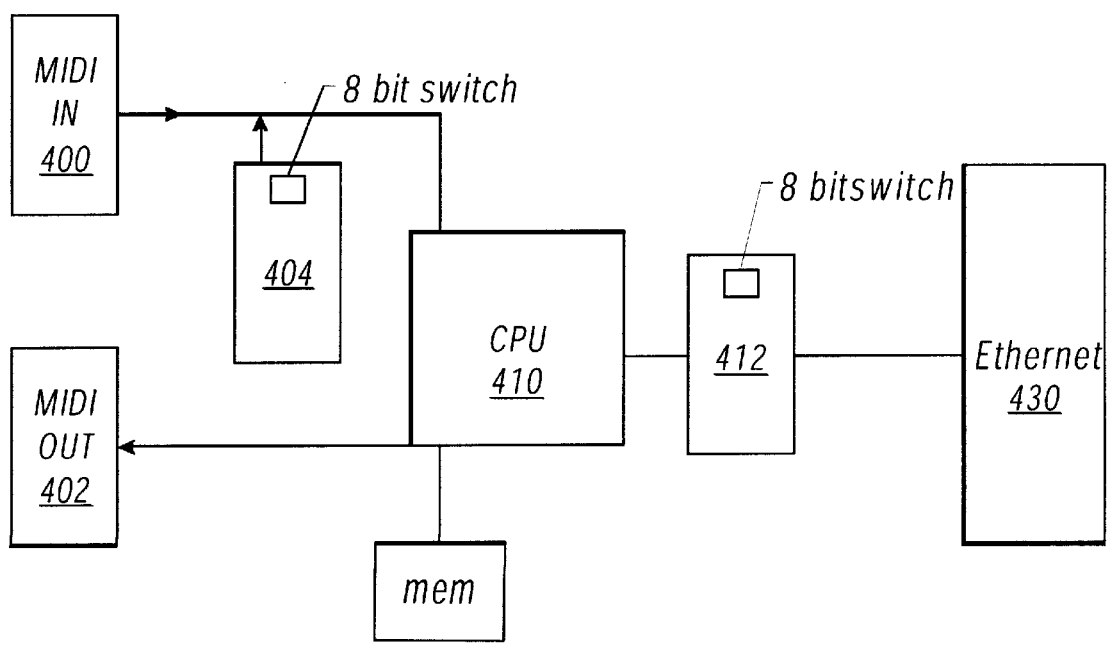
FIG. 4 shows a block diagram of the MIDI conversion device of the present invention.

FIG. 4 shows the block diagram of the preferred system used as the format conversion. MIDI in port 400 and MIDI out port 402 are respectively connected to the MIDI—controlled device, e.g., the musical instrument. CPU 410 runs a program that operates as described herein. The process detects MIDI data at the MIDI in port 400, and in response, translates the MIDI message into a MIDItalk packet. Output switch 412 is an eight bit switch. Its bits are set as the bit mask for the Ethernet message.

This operation enables Ethernet transceiver 430 to send the packet, obeying all the usual Ethernet media access rules.

Ethernet transceiver also responds to an incoming Ethernet packet. The first test is whether the incoming packet has a $880E type and $42 type which would indicate a MIDItalk packet. If so, the packet is investigated to determine if MIDI data is contained in the packet. Other data, such as DMX could alternately be in the packet. If MIDI is present in the packet, the bit mask in the packet is "and"ed with the bit mask of the input switch 404. If the answer is non-zero, the data is sent to the MIDI out connector 402.

Although only a few embodiments have been described in detail above, many modifications are possible in the preferred embodiments without departing from the scope of the claims.

For example, protocols other than Ethernet can be used. It may even be preferred to use network hardware that is not standard, since these items can often be obtained at a good deal.

Importantly, the MIDITALK protocol can be transported over virtually any Ethernet physical link. This includes thick and thin Ethernet bus systems, 10-base T hub systems, Token Ring system, and infra red or radio links. The 10M Baud Ethernet technique allows 2 orders of magnitude faster communication than conventional MIDI.

Although the above has described use of Ethernet, it should be noted that other protocols including LocalTalk and FireWire from Apple Computer could also be used to carry the protocol. The common techniques are used for all of these protocols include modifying the Ethernet protocol in a way that makes it more MIDI-like. Most preferred is to modify the information for broadcast operation.

An important part of the present invention is to make the MIDI and the network protocol more like one another so that the MIDI information can be transmitted over the network. The preferred way according to the present invention is to make the network send the information to multiple receiving points. Other modifications are also contemplated.

What is claimed is:

1. A system for allowing MIDI format information communications over a network port, comprising:

first, second, and third MIDI communicating devices, each of said devices producing MIDI format information;

an Ethernet network connection, communicating using standard Ethernet protocol, and connects at least to said first, second, and third MIDI communicating devices; and an interface assembly operates to transmit said MIDI format information to all of said first, second, and third MIDI communicating devices over said Ethernet network connection in a standard Ethernet frame format.

2. A system as in claim 1, wherein said network connection is Ethernet, and said interface assembly modifies said MIDI format information to form an Ethernet broadcast command.

3. A system as in claim 1, wherein said network connection is Ethernet, and said interface assembly modifies said MIDI format information to form an Ethernet multicast command.

4. A system as in claim 1, wherein said network connection is Firewire.

5. A system as in claim 1 wherein said network connection is Ethernet, using an Ethernet-type field $880E.

6. A system for allowing MIDI format communications over a network comprising:

first and second MIDI communicating devices, each of said devices producing MIDI format information;

a third, non MIDI communicating device, said third device producing non-MIDI format information;

an interface assembly, which modifies said MIDI format information to a standard Ethernet frame format information to form one of an Ethernet broadcast command or an Ethernet multicast command; and an Ethernet network connects at least to said first, second, and third devices for transmitting said standard Ethernet frame format information.

7. A system as in claim 6 wherein said Ethernet uses an Ethernet-type field $880E.

8. An Ethernet system which operates to simulate for allowing MIDI format information communications over a network port, comprising:

first, second, and third MIDI communicating devices, each of said devices producing MIDI format information;

an interface assembly, associated with each of said first, second, and third MIDI communicating devices, which modifies said MIDI format information to form an Ethernet frame format message which is transmitted to and received and decoded by multiple Ethernet receiving stations so that each of said multiple Ethernet receiving stations interprets said MIDI format information; and an Ethernet network, having multiple wire lines, connecting together said interface assemblies associated with all of said first, second and third MIDI communicating devices, whereby said Ethernet frame format message is transmitted on said Ethernet network.

9. A method of transmitting MIDI data over a bidirectional network connection, comprising:

connecting at least first, second, and third MIDI communicating devices, which communicate using MIDI data format, said connecting using an Ethernet connection connects at least to said first, second and third MIDI communicating devices;

producing MIDI information from said MIDI communicating devices; and modifying said MIDI informaiton to standard Ethernet broadcast frame format information and transmitting said standard Ethernet broadcast frame format information to multiple locations, including at least all of said first, second, and third MIDI communicating devices at all times, and said modifying comprises commanding standard Ethernet broadcast message to deliver said standard Ethernet broadcast frame format information to multiple locations.

* * * * *